Aug. 16, 1966 L. K. MURRAY 3,266,847
FEED CONTROL TO SURGE TANKS WITH CYCLONE SEPARATORS
Filed March 4, 1965
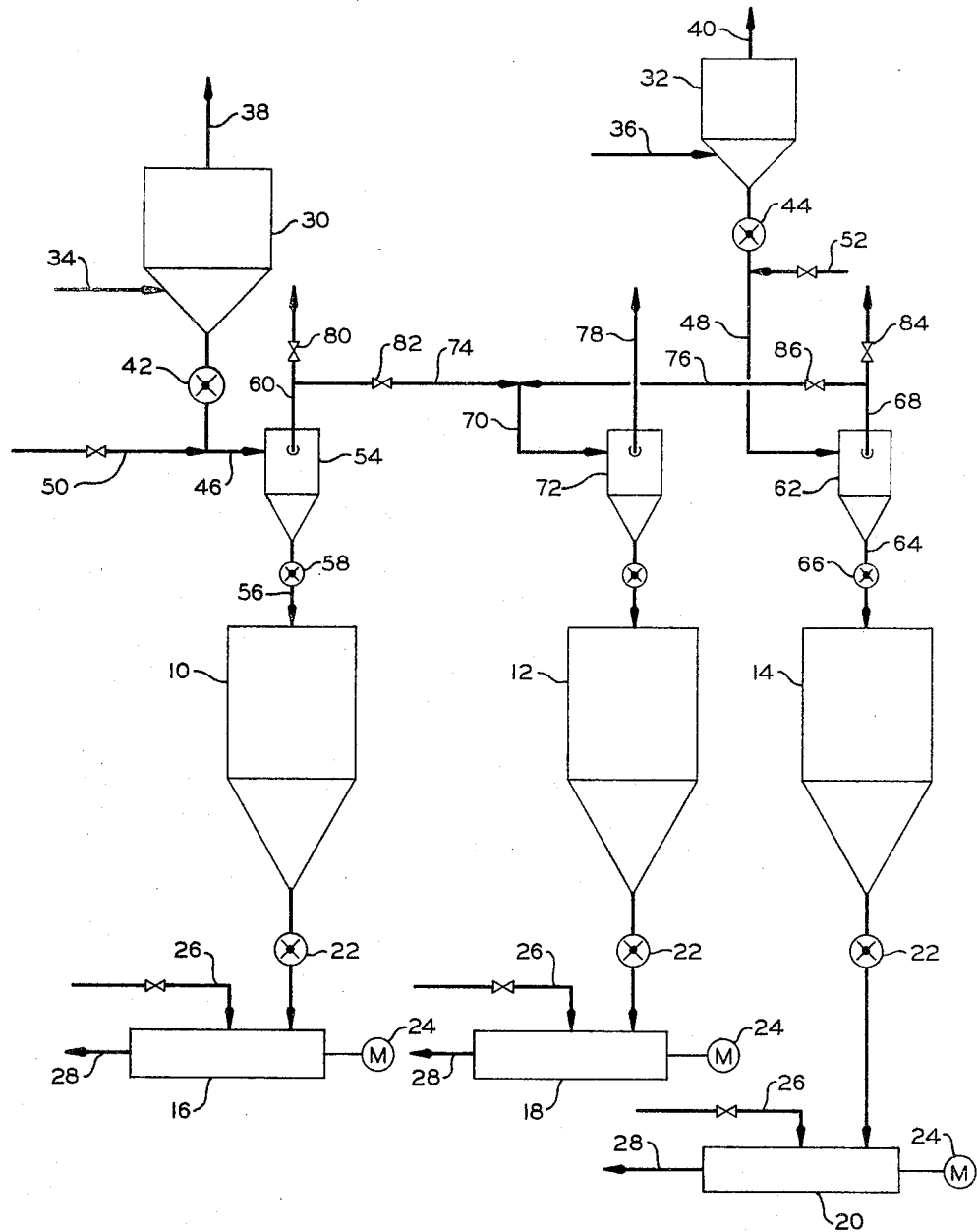
INVENTOR
L. K. MURRAY
BY
*Young & Quigg*
ATTORNEYS

United States Patent Office

3,266,847
Patented August 16, 1966

3,266,847
FEED CONTROL TO SURGE TANKS WITH
CYCLONE SEPARATORS
Lawrence K. Murray, Bartlesville, Okla., assignor to
Phillips Petroleum Company, a corporation of Delaware
Filed Mar. 4, 1965, Ser. No. 437,176
8 Claims. (Cl. 302—17)

This invention relates to a method and apparatus for controlling the feed of fine particulate solids from separate pneumatic conveyors to a number of surge tanks at least one more than the number of conveyors in a system and is particularly adapted to feeding of carbon black suspensions.

While the invention is described and illustrated with carbon black as the solid material being transported, other finely divided solids such as catalysts, adsorbents, and the like may be handled in the manner of the invention with the apparatus disclosed herein.

In the manufacture of carbon black from hydrocarbon feed stocks such as aromatic oils, the feed is partially oxidized at high temperature to form carbon black. The smoke stream from a carbon black furnace or reactor is quenched to a temperature in the range of about 400-500° F. and the quenched stream is conventionally passed thru a bag filter to recover the carbon black from the suspensions. This carbon black is then passed by a pneumatic conveyor to a cyclone separator positioned adjacent a pelleter such as a dry pellet mill or a wet pellet mill. The cyclone separator discharges the carbon black thru a conventional star valve into a surge tank which then feeds the black into the pelleter for the pelleting process.

In a conventional carbon black plant arrangement, the feed from two separate bag filters is fed thru two pneumatic conveyor lines discharge into separate cyclone sep- three separate surge tanks from which the black is fed by controlled rate to three separate wet pelleters. The pneumatic conveyor lines discharge into separate cylone separators each of which feeds the recovered black into a separate two-way conveyor which is a reversible variable drive screw conveyor feeding into either or both of two of three surge tanks, one surge tank being connected to both conveyors so that surplus feed from each of the bag filters or pneumatic conveyors can be fed into a common surge tank. The two-way variable drive screw conveyors are expensive equipment which have relatively high maintenance costs. Another disadvantage in this arrangement lies in the fact that carbon black readily leaks out of the drive screws and contributes to dirty plant conditions.

This invention is concerned with a method and arrangement of apparatus for improving and simplifying the foregoing plant arrangement and method of feeding particulate solids.

Accordingly, it is an object of the invention to provide a novel method and apparatus for feeding a gaseous suspension of particulate solids from two or more pneumatic conveyors to a group of three or more surge tanks, there being at least one more surge tank than conveyors. Another object is to provide a novel method and apparatus for feeding carbon black from a plurality of bag filters to a plurality of surge tanks of at least one more than the number of conveyors. Other objects of the invention will become apparent to one skilled in the art upon consideration of the accompanying disclosure.

In accordance with the invention, the pneumatic conveyors leading from the bag filters deliver the carbon black to separate cyclone separators which feed directly into separate surge tanks. As the supply of carbon black in these surge tanks builds up due to the faster production of carbon black than the rate of pelleting the black received from the surge tanks, the black in the cyclone separators is allowed to build up so that the excess black is carried overhead from the cyclone separators and is passed thru connecting lines to an additional cyclone separator which feeds the additional surge tank in the series. In this manner the excess production of black from the two bag filters (assuming two bag filters and a group of three surge tanks and pelleters) is passed to the third cyclone directly from the cyclones into which the pneumatic conveyors directly feed. This method and arrangement eliminates the troublesome two-way variable drive screw conveyors and greatly simplifies the operation and arrangement.

A more complete understanding of the invention may be had by reference to the accompanying schematic drawing which is a flow sheet showing a preferred arrangement of apparatus in accordance with the invention.

Referring to the drawing, a series of three urge tanks or bins 10, 12, and 14 feed directly into pellet mills or pelleters 16, 18, and 20. The control of feed from the surge bins to the pelleters is effected thru conventional star valves 22 operated by variable speed motors, not shown. The pellet mills are conventional pug mills operated by motors 24 into which water is fed thru lines 26. Effluent pellets are recovered thru lines 28 and passed to dryers, then to storage or bagging facilities.

Bag filters 30 and 32 recover carbon black from the quenched smoke stream in lines 34 and 36, respectively, and the relatively clean off-gas is vented thru lines 38 and 40. The recovered carbon black is fed thru star valves 42 and 44 into conveyor lines 46 and 48, respectively, which receive conveyor gas from lines 50 and 52, respectively. The carbon black suspension from conveyor line 46 is fed directly into cyclone separator 54 and the recovered black is fed thru line 56 under the control of star valve 58 directly into surge tank 10. Effluent gas from separator 54 is vented thru line 60.

In a similar manner the carbon black suspension from pneumatic conveyor 48 is fed directly into cyclone separator 62 from which the recovered black is fed thru line 64 into surge tank 14 under the control of star valve 66. The conveyor gas is vented thru line 68.

Lines 60 and 68 are connected with feed lines 70 leading into a third cyclone separator 72 by means of lines 74 and 76, respectively. When the feed into either one or both of cyclones 54 and 62 has exceeded the pelleting rate of their related pellet mills for any substantial period of time, carbon black builds up in the cyclones and the excess is then passed thru lines 74 and 76, respectively, into the third cyclone via line 70. Clean off-gas is vented from cyclone 72 thru line 78. This control is effected by operation of valves 80 and 82 and by operation of valves 84 and 86.

Surge tanks 10, 12, and 14 are conventionally equipped with level indicators (not shown) which indicate the solids level in the tanks. When the carbon black reaches a selected level, variable speed star valves 58 and 66 are regulated so as to cut down the flow of black into tanks 10 and 14, respectively. At this time, the flow of off-gas thru line 60 is diverted into line 74 by manipulation of valves 80 and 82 which are conventional blind flange or Hamer valves, and the excess black is fed into line 70 and separator 72. A similar procedure is followed with respect to surge tank 14 and separator 62 in diverting excess carbon black from separator 62 to separator 72.

It is also feasible to operate the system with valves 80 and 84 closed and valves 82 and 86 open during the entire period of operation so that any carbon black passing overhead from separators 54 and 62 is automatically trapped and recovered in cyclone separator 72. When operating in this manner, the off-gas from both pneumatic conveyors is always vented thru vent line 78 connected with separator 72.

Certain modifications of the invention will become apparent to those skilled in the art and the illustrative details disclosed are not to be construed as imposing unnecessary limitations on the invention.

I claim:

1. A method of feeding carbon black from a pair of bag filters into three separate surge tanks which comprises the steps of:
   (a) feeding a gaseous suspension of said black from the first of said filters to a cyclone separator feeding black into the first of said tanks;
   (b) feeding black from the bottom section of the cyclone separator of step (a) into said first tank at a slower rate than the feeding rate of step (a) and venting gas from the upper section of said separator;
   (c) feeding a gaseous suspension of said black from the second of said filters to a cyclone separator feeding black into the second of said tanks;
   (d) feeding black from the bottom section of the cyclone separator of step (c) into said second tank at a slower rate than the feeding rate of step (c) and venting gas from the upper section of said separator;
   (e) feeding vent gas from the separators of steps (a) and (c) containing black in excess of the feeds to the first and second tanks into a cyclone separator feeding black into the third of said tanks and feeding black from the bottom section of said separator into said third tank; and
   (f) venting substantially black-free gas from the upper section of the cyclone separator of step (e).

2. The process of claim 1 wherein black is fed from each of said tanks into a separate wet pelleter.

3. Apparatus comprising in combination:
   (1) first, second, and third surge tanks each having inlet means in the upper section and an outlet conduit leading from the bottom having flow control means therein;
   (2) first, second, and third cyclone separators each having a feed inlet in an upper section, a bottom outlet conduit connected with the inlet means of one of said first, second, and third tanks, respectively, having flow control means therein, and a gas outlet conduit in the top;
   (3) feeder means in each of the outlet conduits of (2);
   (4) first and second carbon black filters each having a black outlet conduit in the bottom section thereof;
   (5) first and second pneumatic conveyor means connecting the outlet conduits of the first and second filters of (4) with the feed inlets of the first and second cyclone separators of (2);
   (6) conduit means connecting the gas outlet conduits of the first and second cyclone separators of (2) with the feed inlet of the third cyclone separator of (2); and
   (7) means for controlling the flow of gas and black in the conduits of (6).

4. The apparatus of claim 3 including first, second, and third pelleters connected with the outlet conduits of said first, second, and third tanks of (1), respectively.

5. The apparatus of claim 3 wherein the flow control means of (1) and (2) are star valves.

6. Apparatus for feeding particulate solids from a plurality of pneumatic conveyors to a plurality of surge tanks at least one more than the conveyors comprising in combination:
   (1) a plurality of surge tanks;
   (2) a cyclone separator for each of the tanks of (1) connected by conduit means having flow control means therein with its respective tank;
   (3) a pneumatic conveyor connected with each of the cyclone separators of (2) except one for feeding a gaseous suspension of solids thereto; and
   (4) means for transferring excess solids in gaseous suspension from each of the separators of (2) except said one of (3) to said one separator.

7. The apparatus of claim 6 wherein said tanks number three.

8. The apparatus of claim 7 including a pelleter for each tank connected with the bottom of each of said tanks by conduit.

References Cited by the Examiner

UNITED STATES PATENTS

| | | | |
|---|---|---|---|
| 2,717,658 | 9/1955 | Bethea et al. | 302—17 X |
| 2,898,158 | 8/1959 | Pollock | 302—53 |
| 2,917,374 | 12/1959 | Wood | 23—314 |

EVON C. BLUNK, *Primary Examiner.*

A. H. NIELSEN, *Assistant Examiner.*